US012678928B2

(12) United States Patent
Miyazawa et al.

(10) Patent No.: US 12,678,928 B2

(45) Date of Patent: Jul. 14, 2026

(54) WORK MACHINE

(71) Applicant: KOKI HOLDINGS CO., LTD., Tokyo (JP)

(72) Inventors: Ken Miyazawa, Ibaraki (JP); Shunsuke Okumura, Ibaraki (JP)

(73) Assignee: KOKI HOLDINGS CO., LTD., Tokyo (JP)

(*) Notice: Subject to any disclaimer, the term of this patent is extended or adjusted under 35 U.S.C. 154(b) by 6 days.

(21) Appl. No.: 18/839,885

(22) PCT Filed: Feb. 7, 2023

(86) PCT No.: PCT/JP2023/003913

§ 371 (c)(1),
(2) Date: Aug. 20, 2024

(87) PCT Pub. No.: WO2023/162667

PCT Pub. Date: Aug. 31, 2023

(65) Prior Publication Data

US 2025/0153335 A1 May 15, 2025

(30) Foreign Application Priority Data

Feb. 28, 2022 (JP) ................................ 2022-030165

(51) Int. Cl.
*B25F 5/02* (2006.01)
*B24B 23/02* (2006.01)

(52) U.S. Cl.
CPC .............. *B25F 5/02* (2013.01); *B24B 23/028* (2013.01)

(58) Field of Classification Search
CPC ................................ B25F 5/02; B24B 23/028
See application file for complete search history.

(56) References Cited

U.S. PATENT DOCUMENTS

| | | | | |
|---|---|---|---|---|
| 10,045,606 B2 * | 8/2018 | Cirincione, II | ........... | B25F 5/02 |
| 2005/0196273 A1 * | 9/2005 | Nishikawa | ............... | H02K 9/06 415/206 |
| 2006/0070761 A1 * | 4/2006 | Vahabi-Nejad | ........... | B25C 7/00 173/171 |

(Continued)

FOREIGN PATENT DOCUMENTS

| | | |
|---|---|---|
| JP | 2015164754 A | 9/2015 |
| JP | 2019181596 A | 10/2019 |
| JP | 2020121406 A | 8/2020 |

*Primary Examiner* — Dariush Seif

(74) *Attorney, Agent, or Firm* — NovoTechIP International PLLC

(57) ABSTRACT

The present invention becomes a non-operating state when suspended. In grinder, moving a slide bar in a housing from an OFF to an ON position switches a switch from an OFF to an ON state. A motor stop lever is movably provided in the housing, and is configured to be couplable to a suspension device. Upon receiving a rear tensile force from the suspension device, the motor stop lever moves from an initial position to a withdrawn position. Then, supported portion of the slide bar in the ON position moves to the left, switching the switch from the ON to the OFF state. Specifically, in the withdrawn position of the motor stop lever, a posture-maintaining state of the slide bar in the ON position by the motor stop lever is released, changing a posture of the slide bar, thus switching the switch from the ON to the OFF state.

17 Claims, 12 Drawing Sheets

(56) References Cited

U.S. PATENT DOCUMENTS

| | | | | |
|---|---|---|---|---|
| 2006/0276114 | A1* | 12/2006 | Gallagher | B24B 55/102 451/344 |
| 2007/0102268 | A1* | 5/2007 | Hofmann | H01R 13/7036 200/43.11 |
| 2011/0227429 | A1* | 9/2011 | Takeda | B24B 55/052 310/50 |
| 2011/0241456 | A1* | 10/2011 | Onose | B25B 21/00 310/50 |
| 2012/0031635 | A1* | 2/2012 | Svennung | B27B 17/08 30/381 |
| 2016/0144530 | A1* | 5/2016 | Weinig | B23D 57/023 439/180 |
| 2017/0072534 | A1* | 3/2017 | Nakamura | B25F 5/02 |
| 2019/0143555 | A1* | 5/2019 | Nakashima | B23D 45/16 30/376 |
| 2019/0358769 | A1* | 11/2019 | Miyazawa | B25F 5/02 |
| 2020/0262047 | A1* | 8/2020 | Numata | B25F 5/02 |
| 2020/0331138 | A1* | 10/2020 | Ejiri | B24B 23/02 |
| 2021/0053175 | A1* | 2/2021 | Otani | B24B 23/02 |
| 2021/0252665 | A1* | 8/2021 | Petsri | B24B 23/06 |
| 2022/0118596 | A1* | 4/2022 | Hatakeyama | B25F 5/02 |
| 2022/0288766 | A1* | 9/2022 | Murui | H01M 50/213 |
| 2024/0100729 | A1* | 3/2024 | Zhao | B26D 7/24 |
| 2025/0153335 | A1* | 5/2025 | Miyazawa | B25F 5/02 |

* cited by examiner

WORK MACHINE

BACKGROUND OF THE INVENTION

1. Field of the Invention

The present invention relates to a work machine.

2. Description of the Related Art

In a disk grinder (work machine) described in Patent Literature 1 below, operating a trigger lever on a handle housing drives a motor, which rotates a grindstone attached on a tip of the disk grinder. This allows the disk grinder to perform grinding and other operations on a material to be processed. In addition, some disc grinders maintain the motor in a drive state by holding the trigger lever or other operating portion in an operating position to improve workability.

RELATED ART LITERATURE

Patent Literature

[Patent Literature 1]
Japanese Patent Application Publication No. 2020-121406.

SUMMARY OF THE INVENTION

Disclosure of the Invention

Problem to be Solved by the Invention

With work machine such as the disk grinder, an operator works with the work machine in their hand. Therefore, there is a possibility that the work machine may come off the operator's hands and fall to ground due to the operator's carelessness. Therefore, for example, by coupling a suspension device or the like to the disk grinder, the disk grinder can be prevented from falling to the ground. In other words, even if the disk grinder is separated from the operator's hand, the suspension device will keep the disk grinder in a suspended state, preventing it from falling to the ground. This prevents, for example, damage to the disk grinder.

For example, when the trigger lever is held in the operating position and the disk grinder is placed in the suspended state, the motor continues to be driven. However, at this time, since the disk grinder is away from the operator's hand, no processing is performed using the disc grinder. Therefore, in this state, it is preferable to stop the motor drive and return the disk grinder to a non-operating state (an initial state before the operator starts operating).

Considering the above facts, the present invention aims to provide the work machine that can be put into the non-operating state when suspended.

Means to Solve the Problem

At least one embodiment of the present invention is a work machine comprising: a motor; a housing that houses the motor; a switch housed in the housing and configured to be switchable to an ON state to drive the motor or an OFF state to stop the motor; and, a suspension device supported by the housing, wherein, the switch is configured to be turned in the ON state to the OFF state when the suspension device is pulled.

At least one embodiment of the present invention is the work machine, wherein the housing has a transmission mechanism that is movable between an initial position and a withdrawn position, wherein the transmission mechanism is configured to move from the initial position to the withdrawn position by being pulled via the suspension device to turn the switch in the ON state to the OFF state when in the initial position.

At least one embodiment of the present invention is a work machine comprising: a motor configured to be switchable between drive and stop; a housing that houses the motor; and, a transmission mechanism that is movable between an initial position and a withdrawn position in the housing, and connected to a suspension device, wherein the transmission mechanism: allows the motor to switch between the drive and the stop when in the initial position and restricts the drive of the motor when in the withdrawn position, and, is configured to be displaceable from the initial position to the withdrawn position by being pulled via the suspension device, and to be able to return to the initial position after being displaced to the withdrawn position.

At least one embodiment of the present invention is a work machine comprising: a motor; a housing that houses the motor; a switch housed in the housing and configured to be switchable to an ON state to drive the motor or an OFF state to stop the motor; a switching portion that switches the switch from the OFF state to the ON state by moving from an OFF position to an ON position based on operation from an operator; an ON-lock mechanism that locks the switching portion in the ON position; and, a suspension device supported by the housing, wherein a locked state of the ON-lock mechanism to the switching portion is configured to be released when the suspension device is pulled.

At least one embodiment of the present invention is the work machine comprising a switching portion movably provided inside the housing, wherein the switching portion switches the switch from the OFF state to the ON state by moving from an OFF position to an ON position based on operation from an operator.

At least one embodiment of the present invention is the work machine, wherein the switching portion is configured to move from the OFF position to the ON position based on operation from the operator, thereby changing the relative position of the switch and the switching portion to switch the switch from the OFF state to the ON state, wherein a relative position of the switch portion and the switch is changed by pulling the suspension device, and the switch is switched from the ON state to the OFF state.

At least one embodiment of the present invention is the work machine, wherein the transmission mechanism, in the initial position, maintains a posture of the switching portion in the ON position, wherein the transmission mechanism, in the withdrawn position, releases a posture-maintaining state of the ON position with respect to the switching portion and changes the posture of the switching portion to switch the switch from the ON state to the OFF state.

At least one embodiment of the present invention is the work machine, wherein the housing is provided with an operating portion, which is integrally and movably coupled to the switching portion for operation, wherein the operating portion is engaged with the housing to hold the operating portion and the switching portion in the ON position, and, wherein an engagement state between the operating portion and the housing is released by moving the transmission mechanism from the initial position to the withdrawn position.

At least one embodiment of the present invention is the work machine, wherein the switching portion is extended in first direction, wherein the operating portion is coupled to one side end of the switching portion in the first direction, and a switch pressure portion extending to one side in second direction, which is orthogonal to the first direction, is provided on other side end of the switching portion in the first direction, wherein the switch pressure portion, in the ON position of the switching portion, presses the switch to said one side in the first direction, wherein the transmission mechanism maintains the posture of the switching portion by supporting the other side end of the switching portion in the first direction from other side in the second direction.

At least one embodiment of the present invention is the work machine, wherein the switch is supported by a switch support member, wherein the switch support member is provided in the housing, movable in the first direction and is interlockably coupled to the transmission mechanism, wherein the switch support member moves to one side in the first direction in conjunction with a movement of the transmission mechanism from the initial position to the withdrawn position.

At least one embodiment of the present invention is the work machine, wherein the switch pressure portion is coupled to the transmission mechanism by a coupling member, wherein the switch pressure portion, as the transmission mechanism moves from the initial position to the withdrawn position, is pulled by the coupling member to the other side in the first direction and displaced to the other side in the first direction.

At least one embodiment of the present invention is the work machine, wherein the transmission mechanism is extended in the first direction and coupled to the housing, movable in the first direction, wherein one side portion of the transmission mechanism in the first direction is disposed between the housing and the switching portion inside the housing to support the switching portion, wherein a suspension coupling portion configured to be couplable to the suspension device outside the housing is formed on the other side end of the transmission mechanism in the first direction.

At least one embodiment of the present invention is the work machine, wherein a stopper portion is provided at said one side end of the transmission mechanism in the first direction, wherein the stopper portion, in the withdrawn position of the transmission mechanism, is in contact with the housing, thereby restricting the movement of the transmission mechanism toward the withdrawn position.

At least one embodiment of the present invention is the work machine, wherein an inclined surface on the side surface on one side in the second direction is formed on the one side end of the transmission mechanism in the first direction, and the inclined surface is inclined toward the other side in the second direction toward the one side in the first direction.

Advantage of the Present Invention

According to one or more embodiments of the invention, the work machine can be put into a non-operating state when suspended.

DETAILED DESCRIPTION OF THE INVENTION

Hereinafter, a disk grinder 10 (hereinafter simply referred to as a grinder 10) as a work machine according to present embodiment will be described using drawings. Arrows UP, FR, and LH shown in drawings as appropriate indicate upper, front, and left sides of the grinder 10, respectively. In the following description, when directions up-down, front-back, and left-right are used, they shall indicate vertical, front and back, and left and right directions of the grinder 10, unless otherwise noted. The front-back direction corresponds to first direction of the invention, and the left-right direction corresponds to second direction of the invention.

Figure 1:
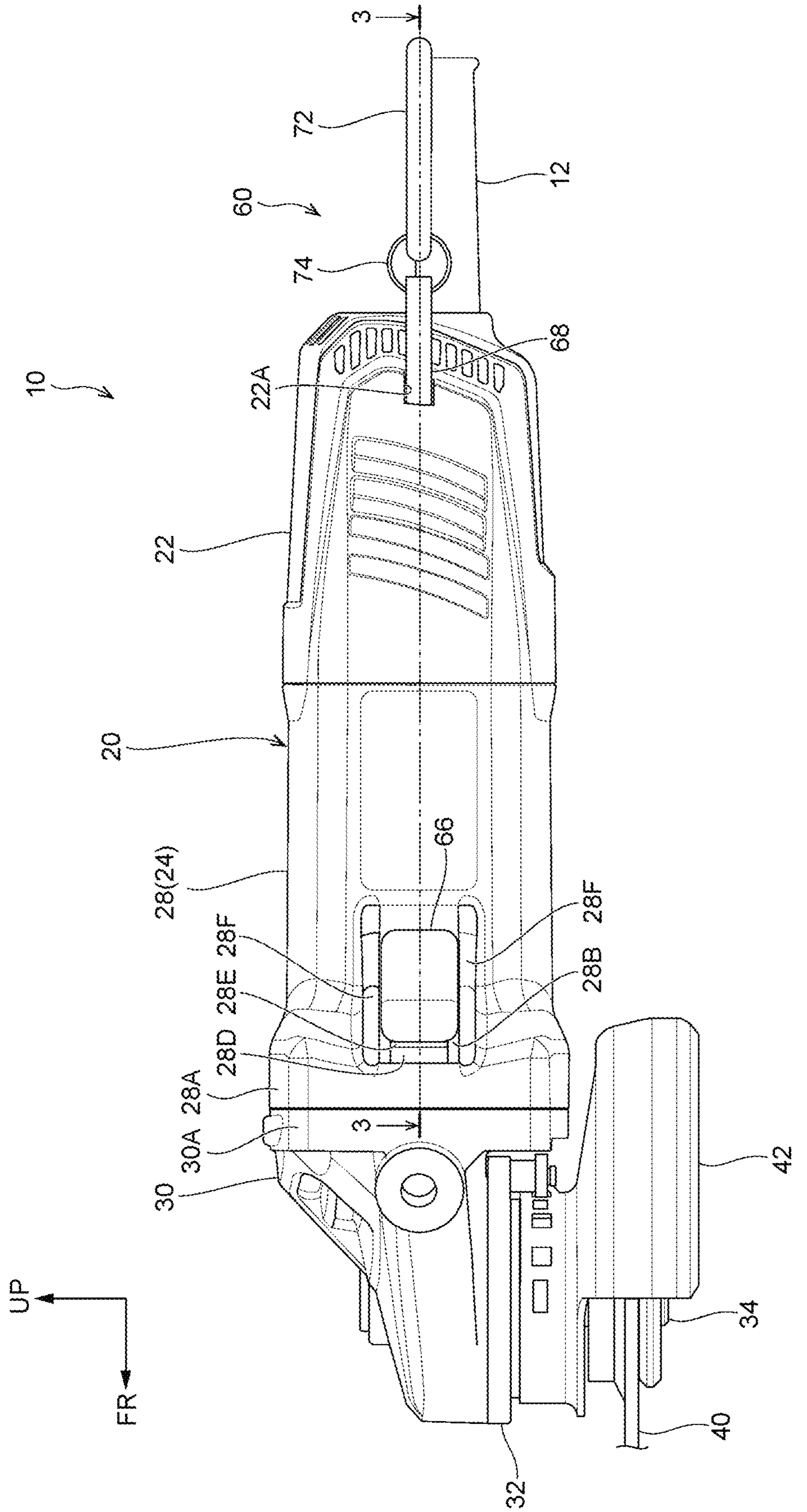
FIG. 1 is a side view from left side showing a disc grinder according to the present embodiment.
Figure 2:
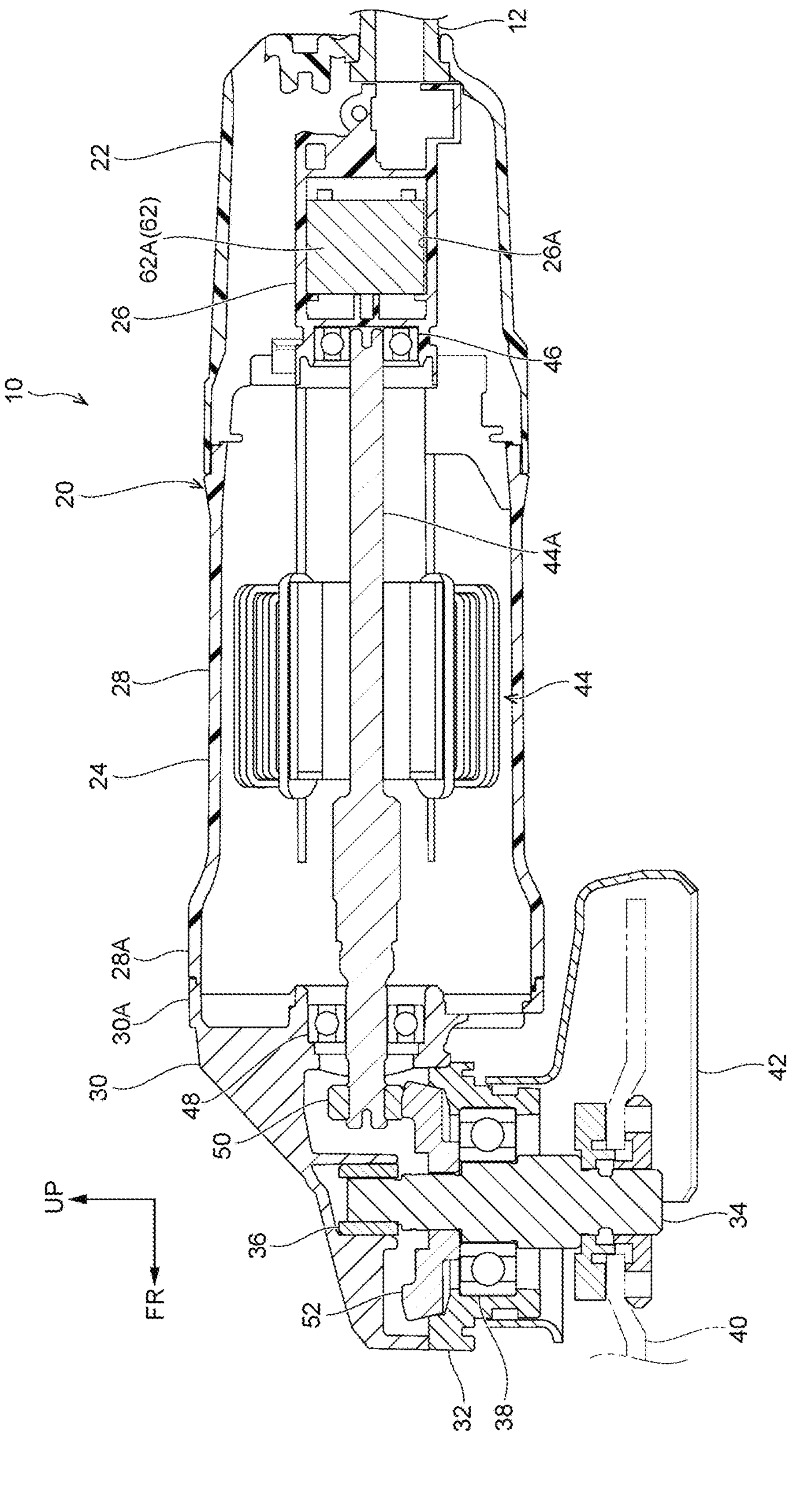
FIG. 2 is a side cross-sectional view from the left side showing inside of the disk grinder shown in FIG. 1.

The grinder 10 is configured as a tool for grinding and other processes on a material to be processed. As shown in FIG. 1 and FIG. 2, the grinder 10 comprises a housing 20, a motor 44, and a switch mechanism 60. Each configuration of the grinder 10 will be described below.

Housing 20

The housing 20 constitutes an outline of the grinder 10. The housing 20 is formed in a shape of a hollow column extending in the front-back direction as a whole. The housing 20 comprises a tail cover 22 that constitutes a rear end outer periphery of the grinder 10, a motor housing 24 extending in the front-back direction, and a gear housing 30 disposed on front side of the motor housing 24.

Figure 3:
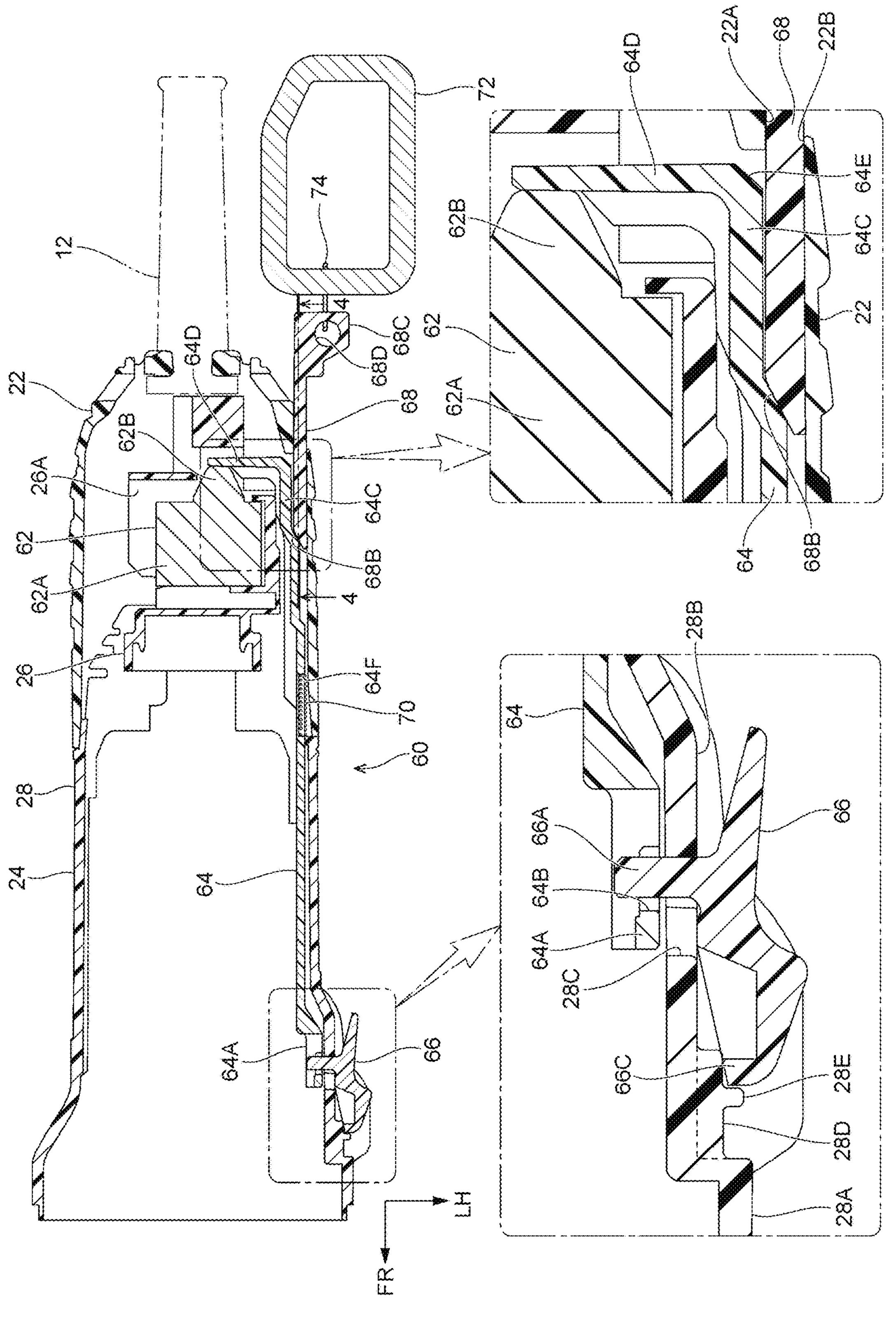
FIG. 3 is the cross-sectional view from upper side (3-3 line cross-sectional view of FIG. 1) showing an attached state of a switch mechanism to a housing shown in FIG. 1.
Figure 4:
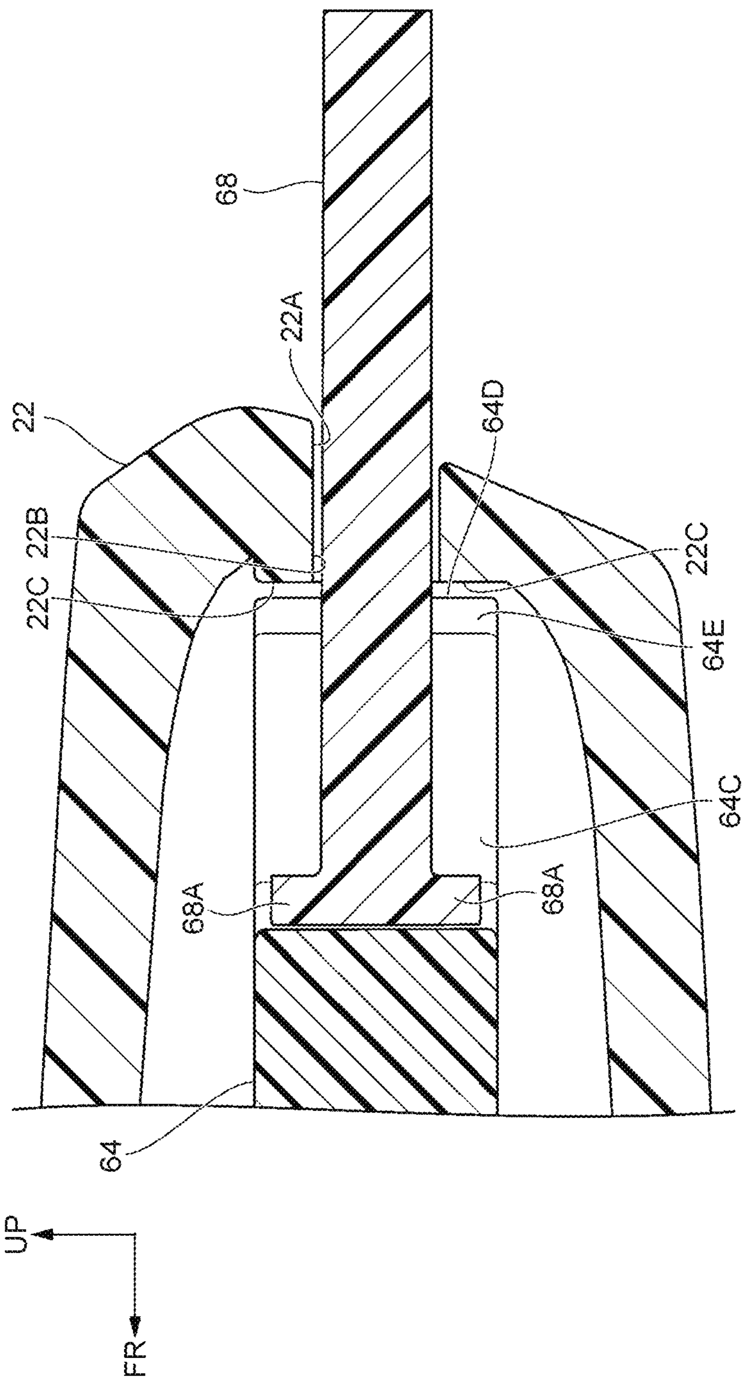
FIG. 4 is the cross-sectional view from the left side (4-4 line cross-sectional view of FIG. 1) showing the attached state of a motor stop lever on a tail cover shown in FIG. 3.

The tail cover 22 is formed as a bottomed cylindrical shape open to the front. A power cord 12 is provided at a rear end portion of the tail cover 22, and the power cord 12 extends from the tail cover 22 to the rear side. The power cord 12 supplies commercial power from an external source to the motor 44 described further below. As shown in FIG. 1, FIG. 3, and FIG. 4, the tail cover 22 has a lever guide portion 22A for guiding a motor stop lever 68 described further below. The lever guide portion 22A is provided on the left side of the rear end portion of the tail cover 22 and in a middle portion in the up-down direction, and is configured to guide the motor stop lever 68 by housing or contacting a portion of the motor stop lever 68 described further below. The lever guide portion 22A is open to the left side and rear side and is formed in a form of a groove along the front-back direction. In front of the lever guide portion 22A, a communicating hole 22B is formed through in the front-back direction to communicate inside of the tail cover 22 with the inside of the lever guide portion 22A. The communicating hole 22B communicates the inside of the tail cover 22 with outside and is connected to the lever guide portion 22A in the front-back direction. The communicating hole 22B is formed in a substantially rectangular shape with the up-down direction as longitudinal direction, and a vertical dimension of the communicating hole 22B matches a width dimension (vertical dimension) of the lever guide portion 22A. Stopper surfaces 22C are formed on an inner circumference of the tail cover 22 on both sides of a front opening of the communicating hole 22B in the up-down direction, and the stopper surfaces 22C are disposed along a surface orthogonal to the front-back direction. The motor stop lever 68, which will be described further below, is configured so that its right side and upper and lower sides can contact the lever guide portion 22A, thereby guiding a front-back direction movement of the motor stop lever 68 with the lever guide portion 22A. The motor stop lever 68, which will be described further below, is surrounded on the top, bottom, left, and right sides by the communicating hole 22B (inner wall of the communicating hole 22B), and the top, bottom, left, and right sides of the motor stop lever 68 are configured to be able to contact the communicating hole 22B, thereby guiding the front-back direction movement of the motor stop lever 68. The motor stop lever 68 is configured to be guided by two different locations (lever guide portion 22A and communicating hole 22B) in the front and back to ensure an accurate movement in the front-back direction, but it may be guided by only one location (communicating hole 22B).

As shown in FIG. 1 to FIG. 3, the motor housing 24 comprises a switch holding portion 26 comprising a rear portion of the motor housing 24, and a housing cylinder portion 28 comprising a front portion of the motor housing 24, wherein the housing cylinder portion 28 is formed in a substantially cylindrical shape with the front-back direction as axial direction. With the switch holding portion 26 housed inside the tail cover 22, the rear end portion of the housing cylinder portion 28 is inserted into a front end portion of the tail cover 22 to couple the motor housing 24 and the tail cover 22. The housing cylinder portion 28 constitutes the middle portion of the outline of the grinder 10 in the front-back direction. The motor housing 24 is configured as a non-divisible (single component). That is, housing cylinder portion 28 is a cylindrical, non-divisible portion.

The switch holding portion 26 has a switch housing portion 26A for housing a switch body 62A of a switch 62 described further below, and the switch housing portion 26A is formed in a substantially rectangular box shape open to the right side. The rear portion of the switch housing portion 26A is open to the left side to house a switch pressure portion 64D of a slide bar 64 described further below. The switch holding portion 26 is part of the motor housing 24. That is, the switch 62 is supported by the motor housing 24.

At the front end portion of the housing cylinder portion 28, a housing coupling portion 28A is formed that extends radially outward, and the housing coupling portion 28A is substantially rectangular in frontal view. As shown in FIG. 1 and FIG. 3, a lever attachment portion 28B for attaching a switch lever 66 described further below is formed at the left portion of a front end portion in the housing cylinder portion 28. The lever attachment portion 28B is formed in a substantially crank shape in plan view and protrudes to the left side with respect to the housing cylinder portion 28, and the front end portion of the lever attachment portion 28B is connected to the housing coupling portion 28A. An attachment hole 28C is formed through the lever attachment portion 28B. At the front end portion of the lever attachment portion 28B, a plate portion 28D raised to the left side is integrally formed, and the plate portion 28D is formed in a substantially rectangular plate shape. An engagement rib 28E extending in the up-down direction is integrally formed in the middle portion of the plate portion 28D in the front-back direction. In addition, guide ribs 28F extending in the front-back direction are formed on both sides of the lever attachment portion 28B in the up-down direction.

As shown in FIG. 1 and FIG. 2, the gear housing 30 is formed in a hollow shape forming a substantially triangular shape when viewed from the left-right direction, and is open to the underside. At the rear end portion of the gear housing 30, a coupled portion 30A is formed. The coupled portion 30A is formed in a substantially rectangular cylindrical shape corresponding to the housing coupling portion 28A of the housing cylindrical portion 28. The housing coupling portion 28A is fitted inside the coupled portion 30A, and an outer circumference of the coupled portion 30A is fastened and fixed to the housing coupling portion 28A at a location not shown. A packing gland 32 is provided on the underside of the gear housing 30. The packing gland 32 is formed in a stepped cylindrical shape with the up-down direction as the axial direction and is fixed to the gear housing 30.

A spindle 34 is provided in the gear housing 30. The spindle 34 is formed in the substantially cylindrical shape with the up-down direction as the axial direction. An upper end portion of the spindle 34 is rotatably supported by a bearing 36 fixed to the gear housing 30, and the middle portion of the spindle 34 in the up-down direction is rotatably supported by a bearing 38 fixed to the packing gland 32. A grindstone 40 as a tip tool is attached to a lower end portion (one side end in the axial direction) of the spindle 34, and the grindstone 40 rotates with the spindle 34 by driving force of the motor 44 described below to perform polishing and other processing on the material to be processed. A wheel guard 42 is removably fixed to the lower end portion of the packing gland 32, and the wheel guard 42 partially covers the grindstone 40.

Motor 44

As shown in FIG. 2, the motor 44 is configured as a brushless motor and is housed within the housing cylinder portion 28 in the housing 20. The motor 44 comprises a rotary shaft 44A, which is disposed with the front-back direction as the axial direction. The rear end portion of the rotary shaft 44A is rotatably supported by a first motor bearing 46 fixed to the switch holding portion 26, and the front end portion of the rotary shaft 44A is rotatably supported by a second motor bearing 48 fixed to the gear housing 30. The front end portion of the rotating shaft 44A is disposed in the gear housing 30, and a pinion gear 50 is fixed to the front end portion of the rotating shaft 44A. The pinion gear 50 is meshed with a bevel gear 52 on the upper end portion of the spindle 34, and drive power of the motor 44 is transmitted to the spindle 34 by the bevel gear 52. The motor 44 is electrically connected to a control unit, which is not shown in the figure, and the motor 44 is driven by the control unit.

Switch Mechanism 60

As shown in FIG. 1 and FIG. 3 to FIG. 6, the switch mechanism 60 is configured as a mechanical portion to switch the motor 44 to drive or stop state. The switch mechanism 60 comprises the switch 62, the slide bar 64 as a switching portion, the switch lever 66 as an operating portion, and the motor stop lever 68 as a stop portion. The motor stop lever 68 is connected to a suspension device 72 and the switch 62 and is part of a transmission mechanism (transmission member) that is displaced by the force received by the suspension device 72. The transmission mechanism also includes a coupling ring 74 that connects the suspension device 72 and the motor stop lever 68. The motor stop lever 68 itself may be used as the transmission mechanism in the present invention.

Switch 62

The switch 62 is housed in the tail cover 22 and held by the switch holding portion 26 of the motor housing 24. The switch 62 comprises a substantially rectangular block-shaped switch body 62A and a plunger 62B protruding rearwardly from the switch body 62A. The switch body 62A is housed in the switch housing portion 26A of the switch holding portion 26, and the plunger 62B is disposed at the rear portion of the switch housing portion 26A. When the plunger 62B is pressed toward the front, the switch 62 is switched from an OFF state to an ON state. The switch 62 is electrically connected to the control unit, and outputs an output signal to the control unit according to a pressured state on the plunger 62B by the slide bar 64, which is described below, and the motor 44 is switched to the drive or stop state by the control unit. The switch body 62A contains a mechanism (e.g., spring) that forces the plunger 62B backward, and the plunger 62B is constantly being pushed backward. Therefore, when the plunger 62B is pressed forward, it must be pressed forward against backward force applied to the plunger 62B.

Slide Bar 64

The slide bar 64 is formed in the form of a substantially long plate that extends in the front-back direction and has the left-right direction as thickness direction. The slide bar 64 is housed in a left end of the inside of the housing cylinder portion 28 and the tail cover 22, and is disposed adjacent to the inner circumference of the housing cylinder portion 28 and the tail cover 22. In detail, the front end portion of the slide bar 64 is disposed on the right side of the lever attachment portion 28B of the housing cylinder portion 28, and the rear end portion of the slide bar 64 is disposed on the front side of the lever guide portion 22A of the tail cover 22. The front end portion of the slide bar 64 is slidably coupled to the housing cylinder portion 28 in the front-back direction by the switch lever 66 described further below, and the rear end portion of the slide bar 64 is supported in the front-back direction by the switch holding portion 26 of the motor housing 24. Specifically, the slide bar 64 is configured to be able to move between an OFF position (position shown in FIG. 3) and an ON position (position shown in FIG. 6), which is moved forward from the OFF position. The following description assumes that the slide bar 64 is positioned in the OFF position.

A lever coupling portion 64A is formed at the front end portion of the slide bar 64 for coupling the switch lever 66 described further below. The lever coupling portion 64A is positioned offset to the left side with respect to the slide bar 64. A coupling hole 64B is formed through the lever coupling portion 64A, and the coupling hole 64B is formed in a substantially C-shape open to the rear side when viewed from the left side.

A supported portion 64C, which is supported by the motor stop lever 68 described further below, is formed at the rear end portion of the slide bar 64. The supported portion 64C is positioned offset to the right side relative to the slide bar 64, and the front end portion of the supported portion 64C is formed in the substantially crank shape in plan view and connected to the slide bar 64. The switch pressure portion 64D is integrally formed at the rear end portion of the supported portion 64C. The switch pressure portion 64D is formed in the substantially rectangular plate shape with the front-back direction as the thickness direction and the left-right direction as the longitudinal direction, and extends from the supported portion 64C to the right side. A tip (right end) portion of the switch pressure portion 64D is inserted from the left side within the rear portion of the switch housing portion 26A of the switch holding portion 26 and is supported by the switch housing portion 26A, slidable in the front-back direction. The tip of the switch pressure portion 64D is disposed adjacent to the rear side of the plunger 62B of the switch 62. When the slide bar 64 slides from the OFF position to the ON position, the plunger 62B is pressed by the switch pressure portion 64D and the switch 62 is switched from the OFF state to the ON state. A chamfer portion 64E is formed at a corner portion that is a connection portion between the supported portion 64C and the switch pressure portion 64D.

A spring housing portion 64F is formed in the middle portion of the left side of the slide bar 64 in the front-back direction. The spring housing portion 64F is formed in a concave shape open to the left side and in a substantially rectangular shape with the front-back direction as the longitudinal direction when viewed from the left side. The spring housing portion 64F houses a return spring 70 configured as a compression coil spring. The front end portion of the return spring 70 is engaged with the rear end surface of the housing cylinder portion 28, and the rear end portion of the return spring 70 is engaged with a rear surface of the spring housing portion 64F. The return spring 70 forces the slide bar 64 toward the rear side (OFF position side).

Switch Lever 66

The switch lever 66 is formed in the shape of the substantially crank-shaped plate in cross-sectional view from upper side. The switch lever 66 is disposed on the left side of the lever attachment portion 28B of the motor housing 24 and between the upper and lower pairs of engagement ribs 28E, and is attached on the lever attachment portion 28B, movable in the front-back direction. A coupling shaft 66A protruding to the right is integrally formed in the rear portion of the switch lever 66. The coupling shaft 66A is formed in a substantially T-shape when viewed from the front-back direction, and the tip of the coupling shaft 66A protrudes to both sides in the up-down direction. The middle portion of the coupling shaft 66A in the left-right direction is inserted into the attachment hole 28C of the lever attachment portion 28B, slidable in front-back direction. The middle portion of the coupling shaft 66A in the left-right direction inserts through the coupling hole 64B of the slide bar 64, and the slide bar 64 and the switch lever 66 are coupled so that they can move together in the front-back direction. In other words, the switch lever 66 is configured to be slidable between the OFF position and the ON position together with the slide bar 64. In the OFF position of the switch lever 66, the coupling shaft 66A contacts the inner circumference of the attachment hole 28C in the motor housing 24 to hold the switch lever 66 and the slide bar 64 in the OFF position.

Figure 5:
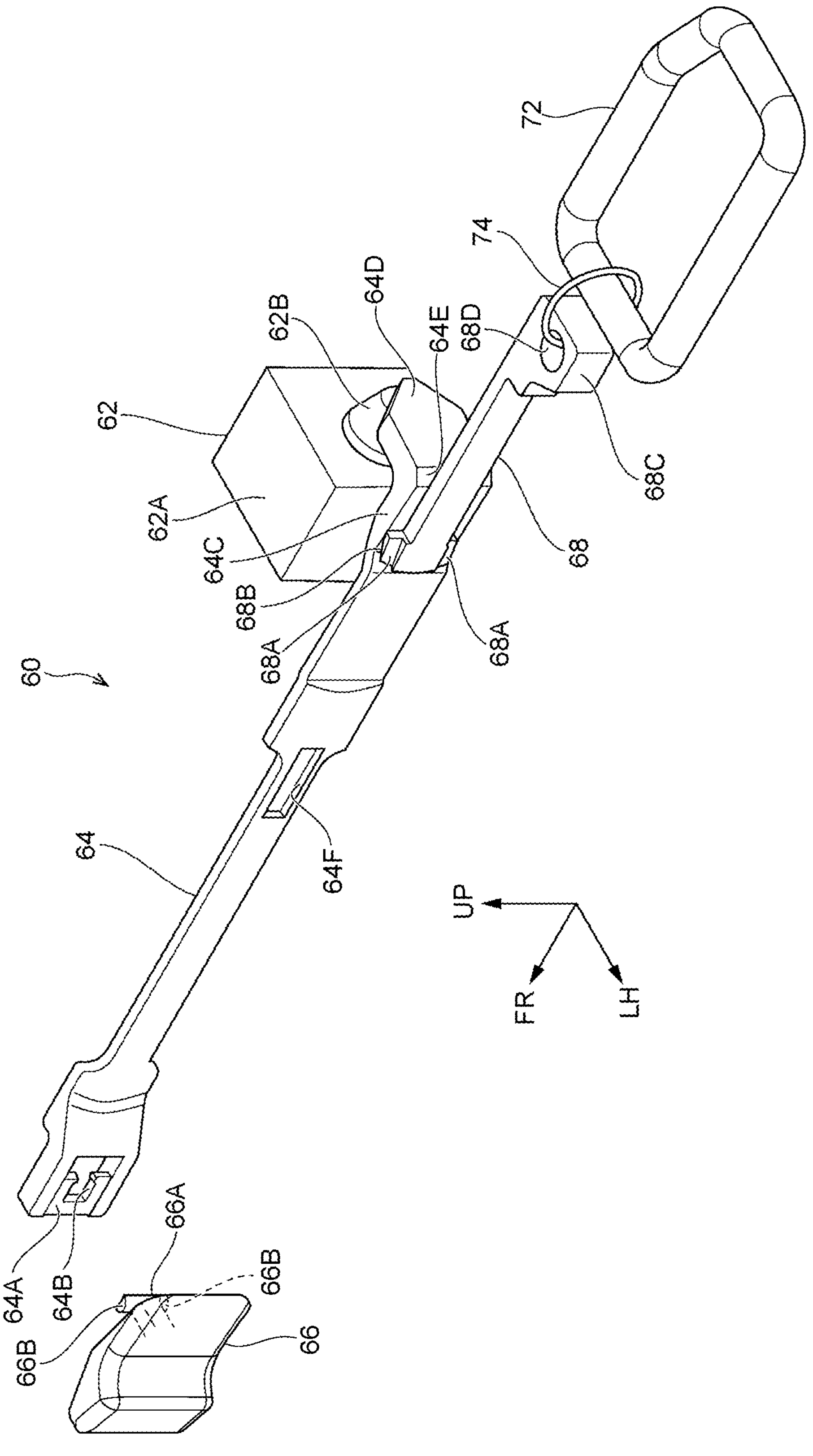
FIG. 5 is an oblique view from left oblique rear showing the switch mechanism shown in FIG. 3.
Figure 6:
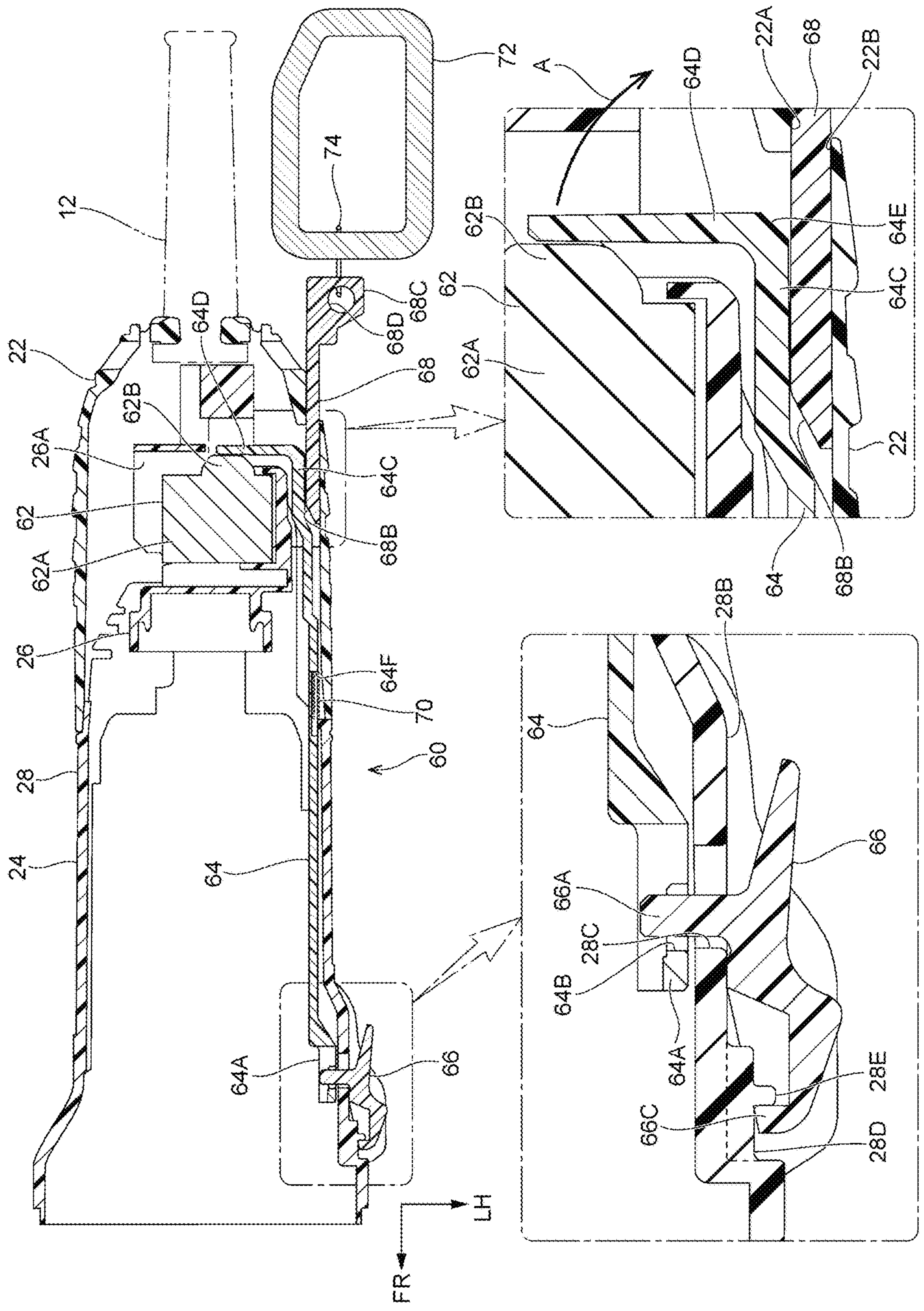
FIG. 6 is the cross-sectional view showing a switch lever and a slide bar moved to an ON position shown in FIG. 3.

Portions protruding to both sides in the up-down direction at the tip of the coupling shaft 66A are configured as a fulcrum portion 66B (see FIG. 5). The fulcrum portion 66B is formed in a substantially semicircular shape convex to the left when viewed from the upper side, and is disposed adjacent to the right side of the lever coupling portion 64A of the slide bar 64. This restricts a movement of the switch lever 66 to the left side. A hook portion 66C bent to the right is formed at the front end portion of the switch lever 66, and the hook portion 66C contacts the rear end portion of the plate portion 28D of the motor housing 24. The force of the return spring 70 is transmitted to the coupling shaft 66A, and the switch lever 66 is held slightly inclined to the right side toward the front in plan view. The switch lever 66 is configured to be pivotable with the fulcrum portion 66B as a fulcrum. Specifically, by pressing the rear end portion of the switch lever 66 to the right, the switch lever 66 pivots with the fulcrum portion 66B as the fulcrum, and the hook portion 66C is displaced to the left. Then, by sliding the switch lever 66 to the ON position while pivoting it, the hook portion 66C is disposed in front of and engages the engagement rib 28E. As a result, the ON position of the switch lever 66 and the slide bar 64 is maintained. In other words, the switch 62 is maintained in the ON state (hereinafter referred to as an ON-lock state). The hook portion 66C and the engagement rib 28E are part of an ON-lock mechanism that enables the switch lever 66 to be held in the ON position (switch 62 in the ON state) even when operating force is released.

Motor Stop Lever 68

The motor stop lever 68 is provided on the tail cover 22 and constitutes a coupling member that couples the suspension device 72 to the tail cover 22 (grinder 10). As mentioned above, the motor stop lever 68 is also a member (or mechanism) connecting the suspension device 72 and the switch 62. The motor stop lever 68 is formed in the form of the substantially long plate that extends in the front-back direction and has the left-right direction as the thickness direction. The motor stop lever 68 is housed in the lever guide portion 22A of the tail cover 22, movable in the front-back direction and is inserted in the communicating hole 22B, movable in the front-back direction. In detail, the motor stop lever 68 is configured to be movable between an initial position (the position shown in FIG. 1, FIG. 3, and FIG. 6) and a withdrawn position (the position shown in FIG. 7), which is moved rearward from the initial position. In a normal state, the motor stop lever 68 is positioned in the initial position, and when a tensile force to the rear side is received from the suspension device 72, the motor stop lever 68 is withdrawn to the rear side and slides to the withdrawn position. In the present invention, the initial position and the withdrawn position may be rephrased as an initial state and an operating state, respectively.

A pair of upper and lower stopper portions 68A are formed at the front end portion of the motor stop lever 68, and the stopper portions 68A protrude to both sides of the motor stop lever 68 in the up-down direction. The rear surface of the stopper portions 68A is formed along a surface orthogonal to the front-back direction. An inclined surface 68B is formed on the right side of the front end portion of the motor stop lever 68. The inclined surface 68B is inclined to the left side toward the front side in the plan view from the upper side.

In the initial position of the motor stop lever 68, the front portion of the motor stop lever 68 is disposed adjacent to the left side of the supported portion 64C of the slide bar 64, supporting the motor stop lever 68 from the left side. In other words, the motor stop lever 68 is configured as the member that limits the movement of the rear end portion of the slide bar 64 to the left side and maintains a posture of the slide bar 64. Thickness of the motor stop lever 68 is substantially equal to an offset amount to the right side of the supported portion 64C of the slide bar 64.

Figure 7:
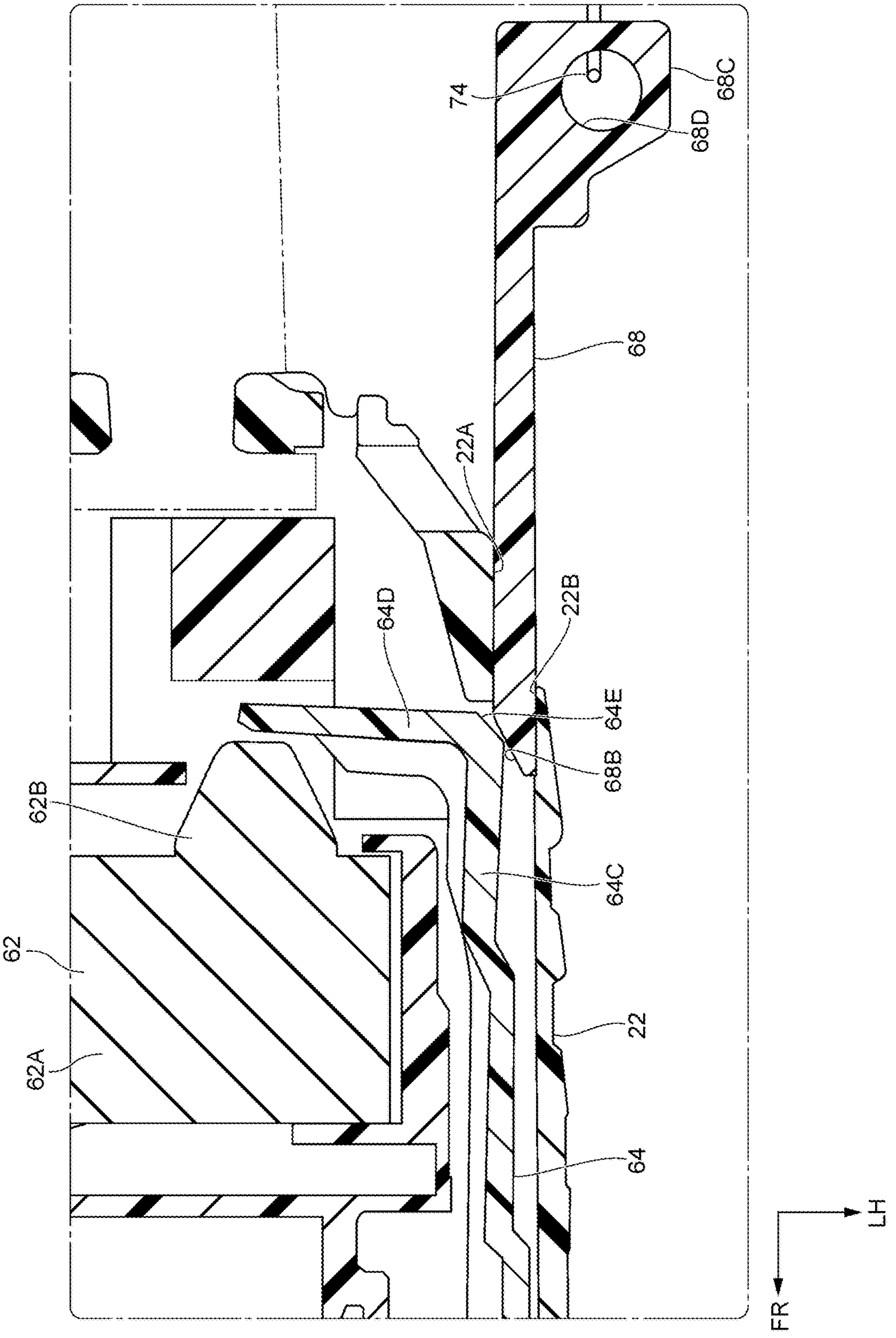
FIG. 7 is an enlarged cross-sectional view showing a state in which the motor stop lever is withdrawn from an initial position to a withdrawn position and the switch is switched from the ON state to the OFF state shown in FIG. 6.

In the withdrawn position of the motor stop lever 68, it is set so that a support state of the slide bar 64 against the supported portion 64C by the motor stop lever 68 is released (see FIG. 7). In other words, in the withdrawn position of the motor stop lever 68, it is set to allow the supported portion 64C to move to the left side. As will be described in detail further below, it is set so that when the motor stop lever 68 is moved to the withdrawn position with the slide bar 64 positioned in the ON position, the pressure of the plunger 62B of the switch 62 on the switch pressure portion 64D changes the posture of the slide bar 64 so that the rear end portion of the slide bar 64 is displaced to the left side, and the switch pressure portion 64D is released from its pressured state. In the withdrawn position of the motor stop lever 68, the rear surface of the stopper portion 68A of the motor stop lever 68 contacts the stopper surface 22C of the tail cover 22 to prevent the motor stop lever 68 from being withdrawn rearward from the communicating hole 22B of the tail cover 22. Furthermore, in the withdrawn position of the motor stop lever 68, the tip of the inclined surface 68B of the motor stop lever 68 is set to overlap the chamfer portion 64E of the slide bar 64 in the OFF position in the front-back direction (see FIG. 7).

A suspension coupling portion 68C is formed at the rear end portion of the motor stop lever 68, and the suspension coupling portion 68C protrudes from the motor stop lever 68 to the left side. A suspension hole 68D is formed through the suspension coupling portion 68C in the up-down direction. The coupling ring 74 of the suspension device 72 is inserted into the suspension hole 68D, and the suspension device 72 is coupled to the motor stop lever 68. One end portion of a strap, not shown, is inserted into the suspension device 72, and other end portion of the strap is fixed to a hanging member when the grinder 10 is being used. When the grinder 10 is removed from an operator's hand, the grinder 10 is suspended by the strap to prevent the grinder 10 from falling to ground. It may be configured so that said one end portion of the strap, not shown, is directly inserted into the suspension coupling portion 68C, i.e., the motor stop lever 68 may be configured to serve as the suspension device.

Operation and Effect

Next, the operation and effects of the grinder 10 of the present embodiment will be described.

During processing with the grinder 10 configured as described above, the operator grips the housing cylinder portion 28 of the motor housing 24 and the tail cover 22. Then, by the operator's sliding the switch lever 66 from the OFF position to the ON position, the slide bar 64 slides from the OFF position to the ON position together with the switch lever 66. As a result, the switch pressure portion 64D of the slide bar 64 presses the plunger 62B of the switch 62 toward the front, causing the switch 62 to switch from the OFF state to the ON state. As a result, the control unit drives the motor 44, and the spindle 34 and the grindstone 40 rotates. Thus, the grinder 10 can apply grinding processing. In the ON position of the switch lever 66, the hook portion 66C of the switch lever 66 engages the engagement rib 28E of the motor housing 24, and the grinder 10 is in the ON-lock state. To release the ON-lock state of the grinder 10, the operator pushes the rear end of the switch lever 66 in the right direction, which causes the switch lever 66 to pivot (rotate) in a counterclockwise direction when viewed from the upper side. As a result, the hook portion 66C and the engagement rib 28E are disengaged and the ON-lock state is released.

In working with the grinder 10, the operator holds the grinder 10 by hand. Here, the grinder 10 has the motor stop lever 68 coupled to the suspension device 72. Therefore, if the grinder 10 were to fall away from the operator's hand, the strap fixed to the suspension device 72 would cause the grinder 10 to be suspended. This prevents the grinder 10 from falling to the ground.

Since a center of gravity of grinder 10 is set around motor 44, when the grinder 10 is in the suspended state, the grinder 10 is suspended so that the front side of grinder 10 faces vertically downward, and a tensile force acts on the motor stop lever 68 to the rear side (vertically upward). This tensile force withdraws the motor stop lever 68 from the initial position to the withdrawn position. As a result, the support state of the motor stop lever 68 to the supported portion 64C of the slide bar 64 is released.

Here, the switch pressure portion 64D of the slide bar 64 extends from the supported portion 64C to the right side, and the tip of the switch pressure portion 64D presses the plunger 62B of the switch 62 toward the front side. Therefore, in the ON position of the slide bar 64, a reaction force acting from the plunger 62B to the switch pressure portion 64D causes a clockwise rotational moment to act on the tip of the switch pressure portion 64D in the plan view (see arrow A in FIG. 6). In other words, a force is acting on the supported portion 64C, which is the rear end of the slide bar 64, to displace the supported portion 64C to the left.

In the suspended state of the grinder 10, as described above, the motor stop lever 68 is withdrawn to the withdrawn position to release the support state of the slide bar 64 to the supported portion 64C by the motor stop lever 68. Therefore, displacement of the supported portion 64C to the left side is permitted. As a result, in the suspended state of the grinder 10, the posture of the slide bar 64 is changed so that the rear end portion of the slide bar 64 is displaced (warped) to the left side, and the pressured state on the switch 62 by the switch pressure portion 64D is released (see FIG. 7). As a result, the switch 62 is switched from the ON state to the OFF state, and the drive of the motor 44 is stopped.

When the posture of the slide bar 64 is changed so that the rear end portion of the slide bar 64 is warped to the left side, the front end portion of the slide bar 64 is displaced to the right side. This causes the lever coupling portion 64A of the slide bar 64 to pull the coupling shaft 66A of the switch lever 66 to the right side, causing the rear end portion of the switch lever 66 to pivot so that the rear end portion of the switch lever 66 is displaced to the right side (by being forced in the right direction). In other words, the switch lever 66 pivots counterclockwise when viewed from the upper side. The movement of the switch lever 66 at this time (counterclockwise pivot) is similar to the above-mentioned movement during the ON-lock release operation by the operator. As a result, an engagement state between the hook portion 66C of the switch lever 66 and the engagement rib 28E of the housing cylinder portion 28 is released. In other words, the ON-lock state of the grinder 10 is released. Therefore, the slide bar 64 and the switch lever 66 slide from the ON position to the OFF position by the force of the return spring 70. At this time, the chamfer portion 64E at the rear end of the slide bar 64 is disposed to the right of the tip of the inclined surface 68B of the motor stop lever 68.

By pushing the motor stop lever 68 forward from the withdrawn position to the initial position, the motor stop lever 68 is returned to the initial position, and the supported portion 64C of the slide bar 64 is supported from the left side by the front portion of the motor stop lever 68. When the motor stop lever 68 is slid from the withdrawn position to the front side, the inclined surface 68B of the motor stop lever 68 contacts the chamfer portion 64E of the slide bar 64, which forces the rear end of the slide bar 64 to the right side, and the motor stop lever 68 is inserted between the supported portion 64C of the slide bar 64 and the tail cover 22. The inclined surface 68B or the chamfer portion 64E serves as a guide when returning the motor stop lever 68 to the initial position.

As described above, in the grinder 10, the switch 62 is switched from the OFF state to the ON state by moving slide bar 64 in housing 20 from the OFF position to the ON position. Here, the motor stop lever 68 is movably provided in the housing 20, and the motor stop lever 68 is configured to be able to be coupled to the suspension device 72. The motor stop lever 68 moves from the initial position to the withdrawn position when a rearward tensile force is received from the suspension device 72. At this time, the supported portion 64C of the slide bar 64 in the ON position moves to the left side, and the switch 62 switches from the ON state to the OFF state. Specifically, in the withdrawn position of the motor stop lever 68, a posture-maintaining state of the motor stop lever 68 with respect to the slide bar 64 in the ON position is released, the posture of the slide bar 64 is changed, and the switch 62 is switched from the ON state to the OFF state. Thus, while the grinder 10 is in the suspended state, the drive of the motor 44 is stopped and the grinder 10 can be placed in the non-operating state. When the grinder 10 is in the suspended state, the supported portion 64C of the slide bar 64 is moved to the left side (retreated state), so the switch 62 cannot be turned on even if the slide bar 64 is moved back and forth. In other words, activation of the motor 44 is also restricted in the grinder 10 in the suspended state.

The switch lever 66 is operably provided in the housing cylinder portion 28, and the switch lever 66 is coupled to the slide bar 64 in an integrally movable manner. In the ON position of the switch lever 66, the hook portion 66C of the switch lever 66 engages the engagement rib 28E of the housing cylinder portion 28, holding the switch lever 66 and the slide bar 64 in the ON position. This allows the grinder 10 to be in the ON-lock position for working. Furthermore, when the motor stop lever 68 is moved to the withdrawn position, the engagement state between the switch lever 66 and the engagement ribs 28E is released as described above. This allows the motor 44 in the driven state to be stopped and the switch lever 66 and the slide bar 64 to be returned to the OFF position when the grinder 10 is placed in the suspended state.

In the slide bar 64, the switch pressure portion 64D extends from the rear end portion of the supported portion 64C to the right side, and the switch 62 is switched to the ON state when the switch pressure portion 64D presses the plunger 62B of the switch 62 to the front side. The motor stop lever 68 is disposed adjacent to the left side of the supported portion 64C to support the supported portion 64C and maintain the posture of the slide bar 64. In the withdrawn position of the motor stop lever 68, the posture-maintaining state of the slide bar 64 at the motor stop lever 68 is released. In the withdrawn position of the motor stop lever 68, the reaction force acting on the switch pressure portion 64D from the plunger 62B of the switch 62 displaces the supported portion 64C of the slide bar 64 in the ON position to the left side to release the pressured state on the switch 62 by the slide bar 64.

The motor stop lever 68 is coupled to the tail cover 22, movable in the front-back direction. The front portion of the motor stop lever 68 is disposed between the tail cover 22 and the supported portion 64C of the slide bar 64 to support the supported portion 64C. This allows the slide bar 64 to be supported by the motor stop lever 68 while preventing the supported portion 64C from being exposed to the outside. Thus, the posture of the slide bar 64 can be maintained by the motor stop lever 68 while the tail cover 22 provides protection to the slide bar 64. The rear end portion of the motor stop lever 68 has the suspension coupling portion 68C that is exposed to the outside of the tail cover 22. This allows the coupling ring 74 of the suspension device 72 to be inserted into the hole 68D of the suspension coupling portion 68C, thereby coupling the motor stop lever 68 and the suspension device 72.

The front end portion of the motor stop lever 68 is provided with the pair of upper and lower stopper portions 68A. In the withdrawn position of the motor stop lever 68, the stopper portions 68A contact the stopper surface 22C of the tail cover 22 to restrict the movement of the motor stop lever 68 to the rear side. This prevents the motor stop lever 68 from falling off the tail cover 22.

The inclined surface 68B is formed on the right side of the front end portion of the motor stop lever 68, and the inclined surface 68B slopes to the left toward the front side in plan view. This allows the motor stop lever 68 to be disposed adjacent to the left side of the slide bar 64 by pushing the supported portion 64C of the slide bar 64 up to the right side by the inclined surface 68B when the motor stop lever 68 in the withdrawn position is moved to the front side.

Moreover, in the OFF position of the slide bar 64 and in the withdrawn position of the motor stop lever 68, the chamfer portion 64E of the slide bar 64 is positioned to overlap the inclined surface 68B of the motor stop lever 68 in the front-back direction. Therefore, when the motor stop lever 68 in the withdrawn position is moved to the front, the motor stop lever 68 can be moved to the front while preventing the motor stop lever 68 from being caught on the slide bar 64. In other words, in the grinder 10 (the present invention), by returning the motor stop lever 68, which is in the withdrawn position after being pulled, to the initial position, the start and stop of the motor 44 can be controlled again by operation of the switch lever 66 (switch 62) by the operator. Since the grinder 10 is configured so that the ON-lock mechanism is released when the grinder is suspended, it is also possible to suppress unintentional restarting of the motor 44 when the motor stop lever 68 is returned to the initial position. The motor stop lever 68 may be configured so that it is always pushed forward by an elastic body such as a spring. In such a case, the elastic body (spring) for restoring the motor stop lever 68 to its initial position may be configured to extend when it is suspended (when it receives the weight of the grinder 10) and to compress or not extend when it is not suspended (when the load received is less than the weight of the grinder 10).

Variant 1 of the Switch Mechanism 60

Figure 8:
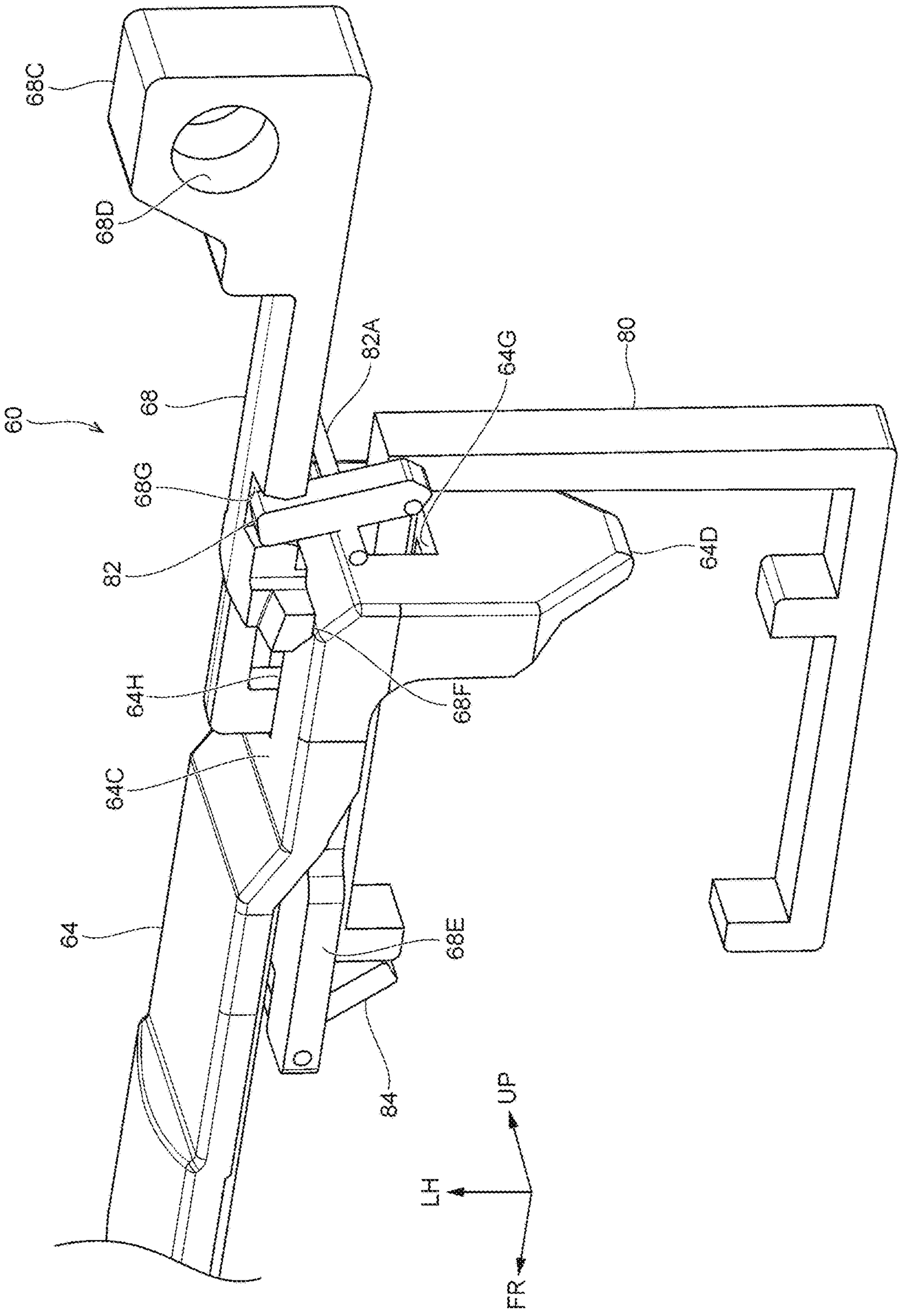
FIG. 8 is a diagram from underside showing Variation 1 of the switch mechanism of the disc grinder.
Figure 9A:
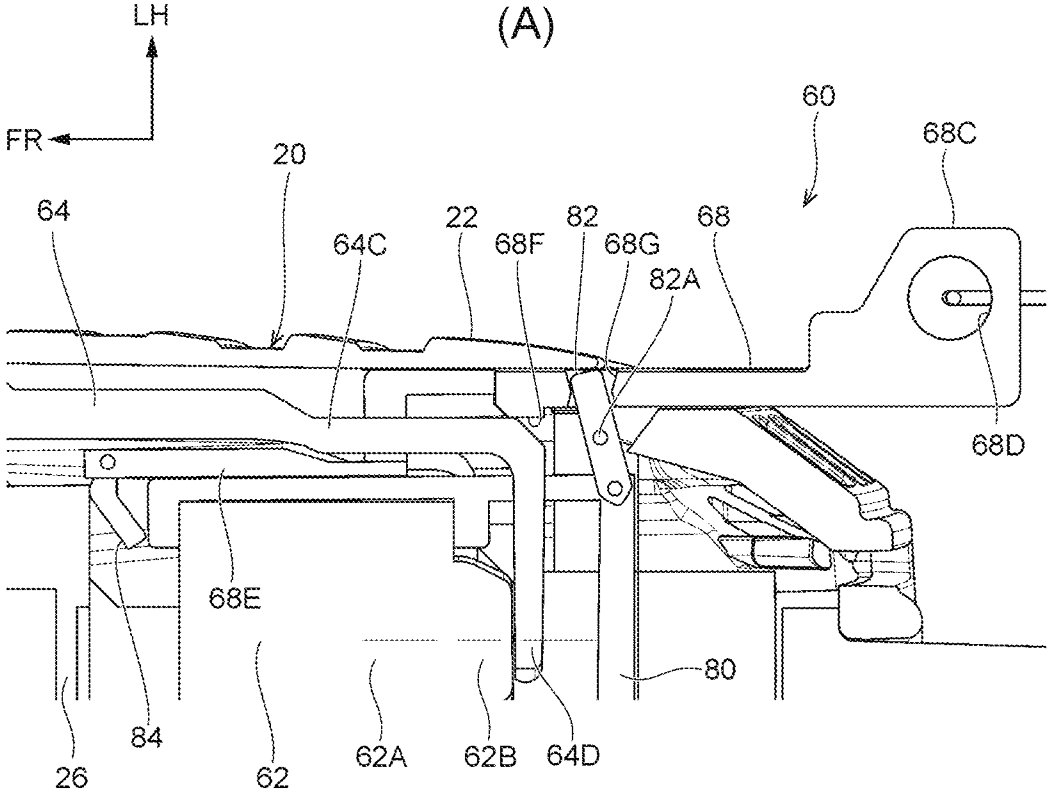
FIG. 9A is a bottom view from underside showing the motor stop lever in the initial position in Variant 1 of the switch mechanism.
Figure 9B:
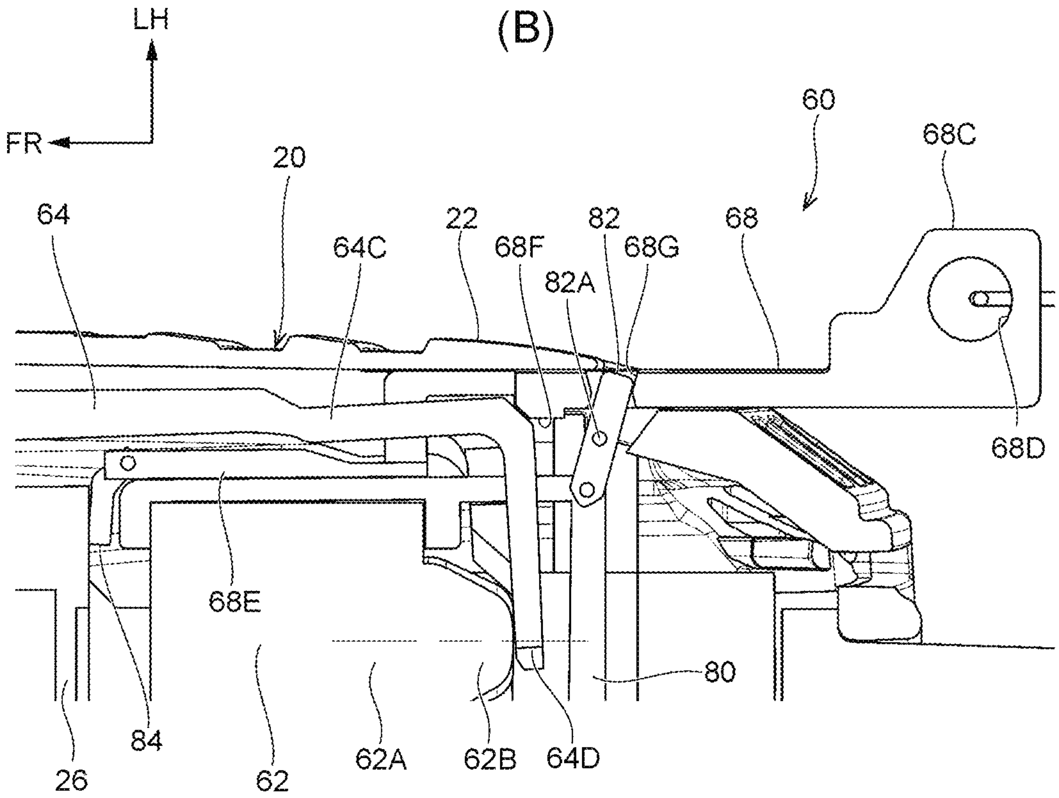
FIG. 9B is the bottom view showing the motor stop lever in FIG. 9A moved to the withdrawn position.

Next, FIG. 8 and FIG. 9 are used to describe Variation 1 of the switch mechanism 60. In FIG. 8 and FIG. 9, members that are similarly configured to the present embodiment are marked with the same symbols. In Variation 1 of the switch mechanism 60, a support frame 80 is added as a switch support member. The support frame 80 is formed in the form of a substantially U-shaped frame open to the front, when viewed from the upper side, and is slidable in the front-back direction on the switch holding portion 26 of the housing 20. Specifically, the support frame 80 is configured to be movable between a normal position (position shown in FIG. 9A) and a separated position (position shown in FIG. 9B), which is moved forward from the normal position. The switch 62 is supported by the support frame 80 and is configured to be movable between the normal position and the separated position integrally with the support frame 80. Furthermore, the left side of the support frame 80 is inserted through a first hole 64G formed in the switch pressure portion 64D of the slide bar 64.

The front end portion of the motor stop lever 68 is integrally provided with front side extension 68E extending in the front-back direction. The front side extension 68E is positioned offset to the right side with respect to the motor stop lever 68, and the rear end portion of the front side extension 68E is bent to the left side and connected to the front end portion of the motor stop lever 68. The rear end portion of the front side extension 68E is inserted through a second hole 64H formed in the supported portion 64C of the slide bar 64, and the front side extension 68E is disposed on the right side of the supported portion 64C.

A support projection 68F is formed on the front end portion of the motor stop lever 68. The support projection 68F protrudes to the right from the motor stop lever 68 and is disposed adjacent to the left side of the supported portion 64C of the slide bar 64 to support the supported portion 64C from the left side. In the Variation 1 of the switch mechanism 60, the movement of the motor stop lever 68 from the initial position to the withdrawn position is set shorter than in the present embodiment (see FIGS. 9A and 9B).

The motor stop lever 68 and the support frame 80 are interlockably coupled by a link 82. The link 82 extends in the left-right direction, and a link pin 82A having the up-down direction as axis direction is provided in a longitudinal middle portion of the link 82. The link pin 82A is rotatably supported by the housing 20. Said one end portion (left end) of the link 82 is inserted into a coupling groove 68G formed in the motor stop lever 68, and the link 82 and the motor stop lever 68 are engaged in the front-back direction. The other end portion (right end) of the link 82 is rotatably coupled to the rear left corner of the support frame 80 with the up-down direction as the axis direction. As a result, the support frame 80 is configured to move between the normal position and the separated position in conjunction with the front-back movement of the motor stop lever 68. Specifically, in the initial position of the motor stop lever 68, the support frame 80 is positioned in the normal position, and in the withdrawn position of the motor stop lever 68, the support frame 80 is positioned in the separated position.

A lock lever 84 is provided at the front end portion of the front side extension 68E of the motor stop lever 68. The lock lever 84 is formed in a substantially V-shape when viewed from the up-down direction, and one end portion of the lock lever 84 is rotatably coupled to the front end portion of the front side extension 68E with the up-down direction as the axis direction. In the normal position of the support frame 80, the other end portion of the lock lever 84 is placed between the front end portion of the support frame 80 and the switch holding portion 26, and the support frame 80 is prevented from moving to the front side. When the motor stop lever 68 is moved from the initial position to the withdrawn position, the lock lever 84 rotates clockwise when viewed from the underside, and the other end portion of the lock lever 84 is displaced to the front side, thereby allowing the support frame 80 to move to the front side.

In Variation 1 of the switch mechanism 60, as in the present embodiment, when the motor stop lever 68 is moved from the initial position to the withdrawn position in the ON position of the slide bar 64, the posture-maintaining state of the motor stop lever 68 with respect to the slide bar 64 is released. Therefore, the posture of the slide bar 64 is changed so that the supported portion 64C of the slide bar 64 is displaced to the left side, and the switch 62 is switched from the ON state to the OFF state. Thus, even in Variation 1 of the switch mechanism 60, while the grinder 10 is in the suspended state, the motor 44 can be stopped to return the grinder 10 to the non-operating state.

In Variation 1 of the switch mechanism 60, when the motor stop lever 68 moves from the initial position to the withdrawn position, the support frame 80 supporting the switch 62 moves forward from the normal position in conjunction with the movement of the motor stop lever 68. In other words, the plunger 62B of the switch 62 moves away from the switch pressure portion 64D of the slide bar 64. As a result, in Variation 1 of the switch mechanism 60, the switch 62 can be separated from the switch pressure portion 64D while changing the posture of the slide bar 64 in the withdrawn position of the motor stop lever 68. Thus, the switch 62 can be effectively switched from the ON state to the OFF state. In the case of Variation 1, the switch 62 is configured to be turned off at both the point where the posture-maintaining state of the motor stop lever 68 with respect to the slide bar 64 is released and the point where the support frame 80 moves forward. However, the switch 62 may be configured to be in the off state only at the point where the support frame 80 moves forward. In other words, the Variation 1 may be configured to change the relative position of the slide bar 64 and the switch 62 by displacing the position of the switch 62 without moving the slide bar 64, thereby changing the pressured state on the plunger 62B.

Variation 2 of Switch Mechanism 60

Figure 10A:
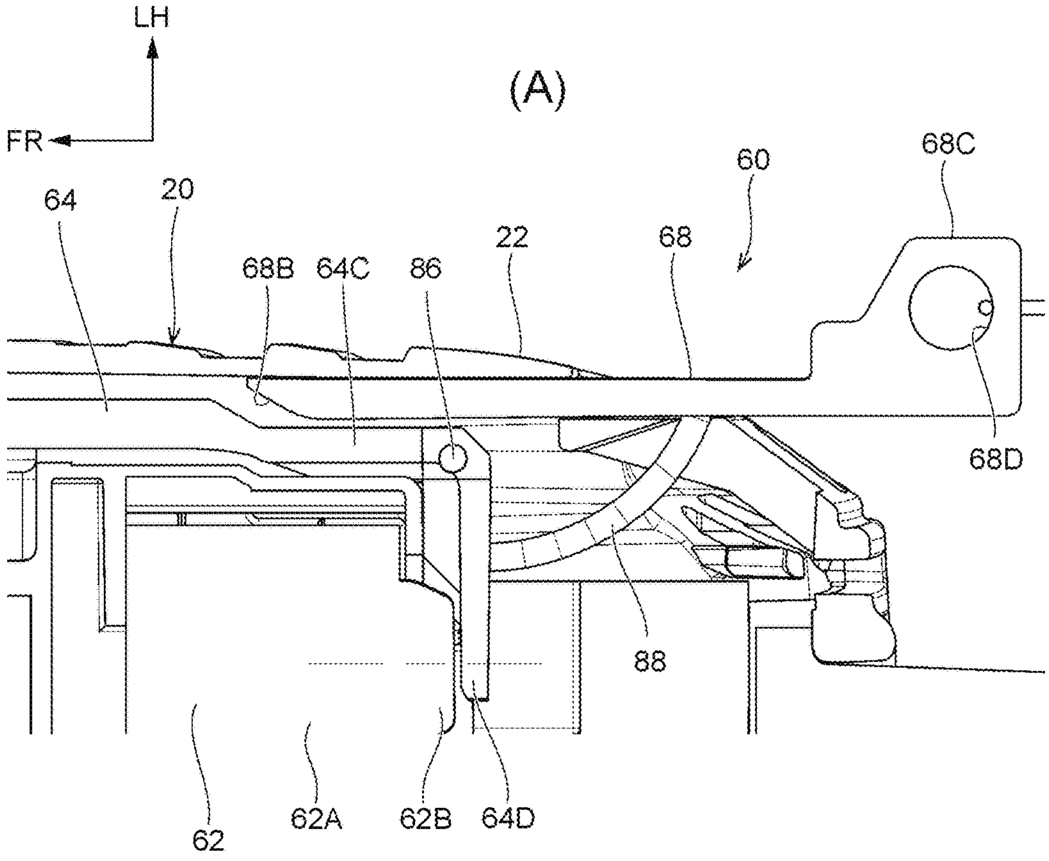
FIG. 10A is the bottom view from the underside showing the motor stop lever in the initial position in Variant 2 of the switch mechanism.
Figure 10B:
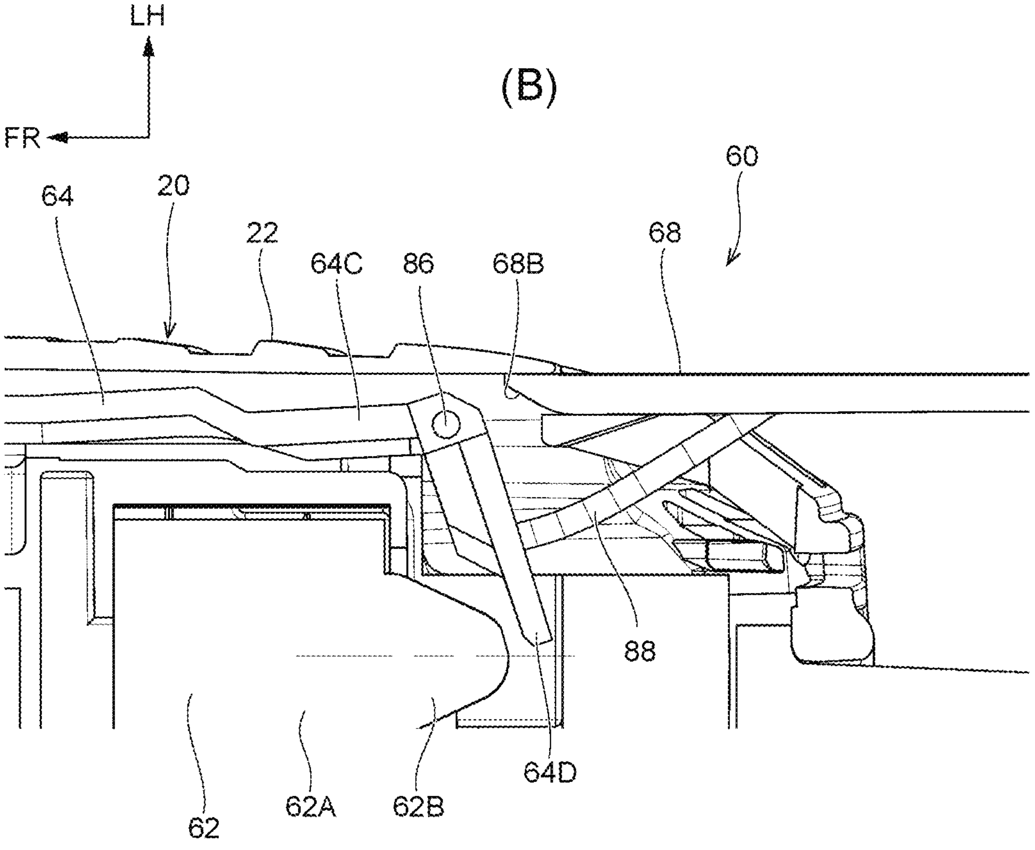
FIG. 10B is the bottom view showing the motor stop lever in FIG. 10A moved to the withdrawn position.

Next, FIG. 10 is used to describe Variation 2 of the switch mechanism 60. In FIG. 10, members that are similarly configured to the present embodiment are marked with the same symbols. In Variation 2, in the slide bar 64, the switch pressure portion 64D is separately configured and coupled to the rear end portion of the slide bar 64 by a coupling pin 86 having the up-down direction as an axis direction. In detail, the coupling pin 86 is press-fitted into the left end of the switch pressure portion 64D and the rear end portion of the slide bar 64, and the switch pressure portion 64D is coupled to the slide bar 64 so as not to be relatively rotatable.

In Variation 2, a coupling member 88 is added in the switch mechanism 60, and the coupling member 88 is configured with a tensile coil spring, wire, or the like. Said one end portion of the coupling member 88 is coupled to the rear surface of the switch pressure portion 64D, and the other end portion of the coupling member 88 is coupled to the right surface of the middle portion of the motor stop lever 68 in the front-back direction.

Here, in Variation 2, when a rearward tensile force acts on the motor stop lever 68 and the motor stop lever 68 moves to the withdrawn position, the coupling member 88 pulls the switch pressure portion 64D rearward, and the tensile force acting on the switch pressure portion 64D causes the switch pressure portion 64D to tilt rearward around the coupling pin 86. In other words, a state of non-rotation of the switch pressure portion 64D relative to the slide bar 64 by the coupling pin 89 is released, and the switch pressure portion 64D rotates relative to the slide bar 64.

In Variation 2 of the switch mechanism 60, as in the present embodiment, when the motor stop lever 68 is moved from the initial position to the withdrawn position in the ON position of the slide bar 64, the posture-maintaining state of the motor stop lever 68 with respect to the slide bar 64 is released. Therefore, the posture of the slide bar 64 is changed so that the supported portion 64C of the slide bar 64 is displaced to the left side, and the switch 62 is switched from the ON state to the OFF state. Thus, even in Variation 2 of the switch mechanism 60, while the grinder 10 is in the suspended state, the drive of the motor 44 can be stopped to return the grinder 10 to the non-operating state. In the present embodiment, the state in which the plunger 62B of switch 62 is pressed is described as the ON state, and the state in which it is not pressed is described as the OFF state. However, it is not limited to this, and a different means such as a sensor may be used as a switch. For example, the switch using a magnetic sensor may be used, in which case, for example, the ON state is the state in which a magnetic material is close enough to the magnetic sensor to be detectable. It may also be a distance sensor, in which case, for example, the ON state is the state in which a detectable object (e.g., slide bar 64) is in proximity to the distance sensor to a detectable degree. In other words, the ON state of the switch in the present invention is not limited to the case where the plunger of the switch is pressed.

In Variation 2 of the switch mechanism 60, when the motor stop lever 68 is moved to the withdrawn position, the switch pressure portion 64D is pulled rearward by the coupling member 88 and tilts rearward around the coupling pin 86. In other words, the switch pressure portion 64D is displaced in a direction away from the plunger 62B of the switch 62. As a result, in Variation 2 of the switch mechanism 60, the switch pressure portion 64D can be separated from the switch 62 while changing the posture of the slide bar 64 in the withdrawn position of the motor stop lever 68. Thus, the switch 62 can be effectively switched from the ON state to the OFF state.

DESCRIPTION OF THE REFERENCE NUMERALS

10: Disk grinder (work machine)
20: Housing
44: Motor
62: Switch
64: Slide bar (switching portion)
64D: Switch pressure portion
66: Switch lever (operating portion)
68: Motor stop lever (stop portion, transmission mechanism)
68A: Stopper portion
68B: Inclined surface
72: Suspension device
80: Support frame (switch support member)
88: Coupling member

What is claimed is:

1. A work machine comprising:
a motor;
a housing that houses the motor;
an operating portion movably supported by the housing and operable by an operator between an active position and a non-active position;
a switch housed in the housing and configured to be in an ON state to drive the motor when the operating portion is in the active position and be in an OFF state to stop the motor when the operating portion is in the non-active position; and
a suspension device supported by the housing,
wherein the switch is configured such that when the suspension device is pulled, a pressing force applied to the switch in the ON state is reduced while the operating portion is in the active position, thereby causing the switch to be in the OFF state.

2. The work machine according to claim 1, wherein the housing has a transmission mechanism that is movable between an initial position and a withdrawn position, and wherein the transmission mechanism is configured to move from the initial position to the withdrawn position by being pulled via the suspension device to turn the switch in the ON state to the OFF state when in the initial position.

3. The work machine according to claim 2 further comprising a switching portion movably provided inside the housing, wherein the switching portion is operable by an operator and configured to switch the switch from the OFF state to the ON state by moving from an OFF position to an ON position based on operation of the operating portion by an operator.

4. The work machine according to claim 3, wherein the switching portion is configured to move from the OFF position to the ON position, thereby changing a relative position of the switch portion with respect to the switch to switch the switch from the OFF state to the ON state, and wherein the relative position of the switch portion with respect to the switch is changed by pulling the suspension device, and the switch is switched from the ON state to the OFF state.

5. The work machine according to claim 4, wherein the transmission mechanism, in the initial position, maintains a posture of the switching portion in the ON position, and wherein the transmission mechanism, in the withdrawn position, releases a posture-maintaining state of the ON position with respect to the switching portion and changes the posture of the switching portion to switch the switch from the ON state to the OFF state.

6. The work machine according to claim 3, wherein the operating portion is integrally and movably coupled to the switching portion, wherein the operating portion is engaged with the housing to hold the operating portion and the switching portion in the ON position, and wherein an engagement state between the operating portion and the housing is released by moving the transmission mechanism from the initial position to the withdrawn position.

7. The work machine according to claim 6, wherein the switching portion is extended in a first direction, wherein the operating portion is coupled to one side end of the switching portion in the first direction, and a switch pressure portion extending to one side in a second direction, which is orthogonal to the first direction, is provided on an other side end of the switching portion in the first direction, wherein the switch pressure portion, in the ON position of the switching portion, presses the switch to the one side in the first direction, and wherein the transmission mechanism maintains a posture of the switching portion by supporting the other side end of the switching portion in the first direction from the other side in the second direction.

8. The work machine according to claim 7, wherein the switch is supported by a switch support member, wherein the switch support member is provided in the housing, movable in the first direction and is interlockably coupled to the transmission mechanism, and wherein the switch support member moves to one side in the first direction in conjunction with a movement of the transmission mechanism from the initial position to the withdrawn position.

9. The work machine according to claim 7, wherein the switch pressure portion is coupled to the transmission mechanism by a coupling member, and wherein the switch pressure portion, as the transmission mechanism moves from the initial position to the withdrawn position, is pulled by the coupling member to the other side in the first direction and displaced to the other side in the first direction.

10. The work machine according to any of the claim 7, wherein the transmission mechanism is extended in the first direction and coupled to the housing movable in the first direction, wherein one side portion of the transmission mechanism in the first direction is disposed between the housing and the switching portion inside the housing to support the switching portion, and wherein a suspension coupling portion configured to be couplable to the suspension device outside the housing is formed on the other side end of the transmission mechanism in the first direction.

11. The work machine according to claim 10, wherein a stopper portion is provided at said one side end of the transmission mechanism in the first direction, and wherein the stopper portion, in the withdrawn position of the transmission mechanism, is in contact with the housing, thereby restricting movement of the transmission mechanism toward the withdrawn position.

12. The work machine according to any of the claim 7, wherein an inclined surface on a side surface on one side in the second direction is formed on the one side end of the transmission mechanism in the first direction, and the inclined surface is inclined toward the other side in the second direction toward the one side in the first direction.

13. The work machine according to claim 1, wherein the suspension device can be pulled to reduce the pressing force on the switch in the ON state to become the OFF state while the operating portion remains in the active position.

14. The work machine according to claim 1, wherein the operating portion is movable between a non-operated position and an operated position, wherein while the suspension device is not pulled, when the operating portion is in the non-operated position, the switch is OFF state, and when the operating portion is in the operated position, the switch is ON state, and wherein, while the suspension device is pulled, the switch is OFF state even when the operating portion is in the operated position.

15. The work machine according to claim 1, further comprising:

a switching portion movably provided inside the housing, wherein the switching portion is configured to move in response to an operation by an operator on the operating portion, thereby changing a relative position of the switching portion with respect to the switch to switch the switch between an OFF state and an ON state, and wherein, in response to pulling of the suspension device, the relative position of the switching portion with respect to the switch is changed with the operating portion being in the ON position, thereby switching the switch from the ON state to the OFF state.

16. A work machine comprising:

a motor configured to be switchable between a drive state and a stop state;

a housing that houses the motor; and a transmission mechanism that is supported by the housing, and connected to a suspension device, wherein the transmission mechanism:

is configured to be movable from an initial position to a withdrawn position and movable from the withdrawn position to the initial position while being supported by the housing, allows the motor to switch between the drive state and the stop state when in the initial position and restricts the drive of the motor when in the withdrawn position, is configured to enter an operating state that restricts driving of the motor by moving from the initial position to the withdrawn position, and is configured to enter an initial state that allows driving of the motor by moving from the withdrawn position to the initial position when in the operating state.

17. A work machine comprising:

a motor;

a housing that houses the motor;

a switch housed in the housing and configured to be switchable to an ON state to drive the motor or to an OFF state to stop the motor;

a switching portion operable by an operator and configured to switch the switch from the OFF state to the ON state by moving from an OFF position to an ON position;

an ON-lock mechanism configured to cause the switching portion to enter an ON-lock state in which the switching portion is held in the ON position after the operation to the switching portion is released; and a suspension device supported by the housing, wherein the ON-lock mechanism is configured to release the ON-lock state of the switching portion and move the switching portion to the OFF position from the ON position when the suspension device is pulled and the switching portion is in the ON-lock state.

* * * * *